US006946187B2

(12) United States Patent
Hürten et al.

(10) Patent No.: US 6,946,187 B2
(45) Date of Patent: Sep. 20, 2005

(54) WATER-VAPOR-PERMEABLE, WATER-RESISTANT COMPOSITE MATERIAL, CLOTHING PRODUCED FROM THE SAME, AND METHOD OF MAKING THE SAME

(75) Inventors: Joachim Hürten, Wuppertal (DE); Volker Schuster, Konigsbronn (DE)

(73) Assignee: Sympatex Technologies, GmbH, Wuppertal (DE)

( * ) Notice: Subject to any disclaimer, the term of this patent is extended or adjusted under 35 U.S.C. 154(b) by 271 days.

(21) Appl. No.: 10/350,032

(22) Filed: Jan. 24, 2003

(65) Prior Publication Data

US 2003/0143381 A1 Jul. 31, 2003

(30) Foreign Application Priority Data

Jan. 30, 2002 (EP) ............................................. 02002241

(51) Int. Cl.⁷ ................................................. B32B 3/00
(52) U.S. Cl. ...................... 428/203; 428/142; 428/201; 442/76; 442/79; 442/86
(58) Field of Search ........................ 442/76, 77, 79–84, 442/86–90; 428/142, 201, 203

(56) References Cited

U.S. PATENT DOCUMENTS

| 4,194,041 | A | | 3/1980 | Gore et al. | |
|---|---|---|---|---|---|
| 5,098,770 | A | * | 3/1992 | Paire | 428/198 |
| 5,948,707 | A | * | 9/1999 | Crawley et al. | 442/101 |
| 6,139,929 | A | * | 10/2000 | Hayton et al. | 428/35.2 |
| 6,511,927 | B1 | * | 1/2003 | Ellis et al. | 442/77 |
| 6,531,419 | B1 | * | 3/2003 | Wyner et al. | 442/136 |
| 2002/0197924 | A1 | * | 12/2002 | Halley et al. | 442/148 |

FOREIGN PATENT DOCUMENTS

| WO | WO 98/06891 | 2/1998 |
|---|---|---|
| WO | WO 00/13889 | 3/2000 |

* cited by examiner

Primary Examiner—Cheryl A. Juska
Assistant Examiner—Jenna-Leigh Befumo
(74) Attorney, Agent, or Firm—Oliff & Berridge, PLC

(57) ABSTRACT

A water-vapor-permeable, water-resistant composite material includes a water-resistant, water-vapor-permeable functional layer with a first and a second side, a material attached to the first side of the functional layer, a plurality of discrete polymer spots forming a discontinuous, lining-producing pattern on the surface of the second side of the functional layer, and a water-vapor-permeable cover layer that is joined at least to the polymer spots. Clothing produced from the water-vapor-permeable, water-resistant composite material includes the features listed above.

21 Claims, No Drawings

WATER-VAPOR-PERMEABLE, WATER-RESISTANT COMPOSITE MATERIAL, CLOTHING PRODUCED FROM THE SAME, AND METHOD OF MAKING THE SAME

BACKGROUND OF THE INVENTION

The invention relates to a water-vapor-permeable, water-resistant composite material having a water-resistant, water-vapor-permeable functional layer with a first and a second side, a material attached to the first side of the functional layer, and a plurality of discrete polymer spots forming a discontinuous, lining-producing pattern on the surface of the second side of the functional layer; clothing comprising the composite material; and a method for making the composite material.

A composite material of this type is known from EP 0 918 902. The polymer spots in this case serve as a substitute lining and must therefore be abrasion-resistant. This requires the selection of hard materials for the polymer spots.

Such composite materials are used to produce lightweight outerwear clothing for protection against wind and rain. Particularly, in the case of sports activity, it is important that the wearer of this clothing be protected not only against rain, but primarily against wind which can trigger colds, especially when perspiration has occurred. If outer clothing produced from such composite material is used in the summer, these articles of clothing frequently come into contact with the wearer's skin, at least on the arms and legs. In this case, it has been observed that the polymer spots arranged on the inside of the composite material contact the skin of the wearer of the clothing and produce discomfort. If this clothing is worn in the winter, the polymer spots do not come into contact with the skin. However, it has been noted that, due to the fact that insulating clothing such as pullover sweaters or the like is worn under the outer clothing, the polymer spots of the composite material frequently prevent easy removal of the outer clothing over the arms and/or legs. This impediment is frequently so pronounced that the arms and/or legs of the clothing are turned inside out on removal and must then be returned to their proper orientation.

SUMMARY OF THE INVENTION

An object of the present invention is to at least reduce the aforementioned disadvantages.

This and other objects are achieved within the scope of the present invention by a water-vapor-permeable, water-resistant composite material having a water-resistant, water-vapor-permeable functional layer with a first and a second side, a material attached to the first side of the functional layer, a plurality of discrete polymer spots forming a discontinuous, lining-producing pattern on the surface of the second side of the functional layer, and a water-vapor-permeable cover layer that is joined at least to the polymer spots; clothing including the composite material; and a method for making the composite material.

DETAILED DESCRIPTION OF PREFERRED EMBODIMENTS

An article of outerwear produced from a composite material according to the invention is regarded as comfortable by the wearer in the summer when it comes into contact with the skin. When the clothing is removed, adherence of the arms and/or legs of the outerwear is not normally observed.

In the simplest case, the cover layer can have a decorative design that suggests that of a lining layer. Preferably, however, the cover layer is transparent, which permits the suggestion of a lining layer by the special arrangement of the discrete polymer spots. This succeeds particularly well when the sum of the areas covered by the polymer spots on the functional layer is about 20 to 60%, preferably 30 to 50%, of the total area of the functional layer. The suggestion of a lining layer can be further reinforced if the functional layer itself contains coloring pigments and thus acts as a colored background for the polymer spots, which can likewise contain coloring pigments. Polymer spots, possibly multi-colored, on a black functional layer have proven particularly decorative.

If the cover layer is joined only to the polymer spots, there is an added advantage that this composite material also exhibits thermal insulation properties due to the air layer enclosed between the functional and cover layers.

It is preferred, however, for the cover layer of the composite material according to the invention to be implemented as a coating that is also joined to the functional layer between the polymer spots. This embodiment is especially distinctive in that it is economical to manufacture.

It has proven especially practical for the cover layer to be made of a hydrophilic material. To the extent that the wearer of an article of clothing made from such a composite material perspires and excretes beads of perspiration, said beads are absorbed by the hydrophilic cover layer and transferred over a wide area outward to the functional layer, thereby releasing the moisture produced by perspiration to the outside in a very short time and thus ensuring a comfortable atmosphere for the wearer of such clothing. In this case, it has proven particularly advantageous for the cover layer to be made of polyurethane, where a cover-layer thickness between 1 and 25 $\mu$m, preferably between 1 and 10 $\mu$m, has proven especially advantageous. Such a cover layer of transparent material significantly reduces the gloss of the functional layers and polymer spots, so that the cover layer, which serves as a substitute lining, then has an attractive appearance.

In particular, it has proven to be an advantage if the polymer spots are comprised of foamed material. A composite material containing such polymer spots is considered to be especially wearer friendly. Furthermore, these polymer spots of foamed material significantly increase the thermal insulation of the composite material. It has proven especially beneficial in the laminate according to the invention for the thickness of the polymer spots to be between 100 and 250 $\mu$m, preferably between 150 and 170 $\mu$m.

A method of making a water-vapor-permeable, water-resistant composite material includes the following steps: providing a water-resistant, water-vapor-permeable functional layer with a first and second side; attaching a material to the first side of the functional layer; providing a plurality of discrete polymer spots, forming a discontinuous lining producing pattern, on the surface of the second side of the functional layer; and joining a water-vapor-permeable cover layer to at least the polymer spots. The material may be attached to the first side in any desired sequence, preferably before providing the polymer spots on the second side. The cover layer is preferably formed from a hydrophilic material such as polyurethane. The cover layer may be provided by coating and joining the cover layer to the functional layer between the polymer spots. Also, the method includes forming the cover layer preferably from a transparent material and covering the functional layer with polymer spots having a sum of areas about 20% to 60%, preferably 30% to 50%, of a total area of the functional layer. The method further includes forming the cover layer and polymer spots with the materials and thicknesses and other features of the product as previously mentioned.

The invention will be described in more detail on the basis of the following example.

Polymer spots are produced on the free second side of the functional layer of a laminate having a weight of about 130 g/m² and consisting of a waterproof, water-vapor-permeable functional layer, sold under the trade name SYMPATEX, and a textile woven fabric made from polyester yarns. The material for the polymer spots, the TUBISCREEN system produced by the Chemische Fabrik Tübingen, Germany, is applied by rotary printing according to the instructions accompanying this system. To apply the system, a stencil is used during the rotary printing that produces triangular polymer spots on the functional layer. After drying and heat-treatment, polymer-foam spots have been formed that are triangular when viewed from above, have a thickness of about 160 μm, and cover about 50% of the functional layer, which is dyed black.

Both the visible areas of the functional layer and the polymer-foam spots exhibit a pronounced gloss. An article of clothing produced from this composite material produces skin discomfort for the wearer and can be removed from the arms and legs only with great effort, frequently having to be turned inside-out. The RET value measured according to ISO 11092 is 17 and thus in a class according to the ENV343 standard, dated February 1998, that denotes the laminate as well suited for protective winter clothing.

The previously described laminate is now provided with a coating on the polymer-spot side in accordance with the present invention. To this end, a commercially available one component polyurethane that is dull, transparent, and water-vapor-permeable is applied using an air squeegee to the second side of the functional layer, which contains the polymer-foam spots. The applied layer has a thickness of about 1 μm over the polymer-foam spots and about 10 μm in the areas in which the coating is joined to the functional layer.

The gloss observable prior to the coating has been reduced significantly and can be regarded as very dull, thus suggesting a normal decorative lining. An article of clothing made from this composite according to the invention produces a comfortable feeling on the wearer's skin and can be readily removed from the arms and legs. The RET value according to ISO 11092 is 19 and thus in the same class according to the ENV343 standard as the laminate prior to coating.

The invention is not limited to the embodiment as disclosed above, but various modifications can be permitted based on the spirit of the invention and these modifications shall not be excluded from the scope of the invention.

What is claimed is:

1. Water-vapor-permeable, water-resistant composite material, comprising:
    a water-resistant, water-vapor-permeable functional layer with a first side and a second side;
    a material attached to the first side of the functional layer;
    a plurality of discrete polymer spots forming a discontinuous, lining-producing pattern on the surface of the second side of the functional layer; and
    a water-vapor-permeable cover layer that is joined at least to the polymer spots, wherein the cover layer is coating that is also joined to the functional layer between the polymer spots.

2. The composite material according to claim 1, wherein the cover layer is made from a transparent material.

3. The composite material according to claim 1, wherein the cover layer is hydrophilic.

4. The composite material according to claim 1, wherein the cover layer is made from polyurethane.

5. The composite material according to claim 1, wherein the cover layer has a thickness of 1 to 25 μm.

6. The composite material according to claim 1, wherein the cover layer has a thickness of 1 to 10 μm.

7. The composite material according to claim 1, wherein the polymer spots are comprised of a foamed material.

8. The composite material according to claim 1, wherein a thickness of the polymer spots is 100 to 250 μm.

9. The composite material according to claim 1, wherein a thickness of the polymer spots is 150 to 170 μm.

10. The composite material according to claim 1, wherein a sum of areas covered by the polymer spots on the functional layer is about 20% to 60% of a total area of the functional layer.

11. The composite material according to claim 1, wherein a sum of areas covered by the polymer spa on the functional layer is 30% to 50% of a total area of the functional layer.

12. The composite material according to claim 1, wherein the cover layer is joined only to the polymer spots.

13. The composite material according to claim 1, wherein the composite material is in the form of clothing.

14. Clothing comprising a composite material that comprises:
    a water-resistant, water-vapor-permeable functional layer with a first side and a second side;
    a material attach to the first side of the functional layer;
    a plurality of discrete polymer spots forming a discontinuous, lining-producing pattern on the surface of the second side of the functional layer; and
    a water-vapor-permeable cover layer that is joined at least to the polymer spots, wherein the cover layer is a coating that is also joined to the functional layer between the polymer spots.

15. A method of making a water-vapor-permeable, water-resistant composite material, comprising:
    providing a water-resistant, water-vapor-permeable functional layer with a first side and a second side;
    attaching a mated to the first side of the functional layer;
    providing a plurality of discrete polymer spots, forming a discontinuous, lining-producing pattern, on the surface of the second side of the functional layer;
    joining a water-vapor-permeable cover layer to at least the polymer spots; and
    forming the cover layer by coating, thereby also joining the cover layer to the functional layer between the polymer spots.

16. The method according to claim 15, comprising forming the cover layer from a transparent material.

17. The method according to claim 15, comprising forming the cover layer from a hydrophilic material.

18. The method according to claim 15, comprising forming the cover layer from polyurethane.

19. The method according to claim 15, comprising forming the polymer spots from a foamed material.

20. The method according to claim 15, wherein a sum of areas covered by the polymer spots on the functional layer is about 20% to 60% of a total area of the functional layer.

21. The method according to claim 15, wherein a sum of areas covered by the polymer spots on the functional layer is 30% to 50% of a total area of the functional layer.

* * * * *

UNITED STATES PATENT AND TRADEMARK OFFICE
CERTIFICATE OF CORRECTION

PATENT NO.     : 6,946,187 B2
DATED          : September 20, 2005
INVENTOR(S)    : Joachim Hurten and Volker Schuster It is certified that error appears in the above-identified patent and that said Letters Patent is hereby corrected as shown below:

Column 3,
Line 63, "is coating" is replaced with -- is a coating --;

Column 4,
Line 20, "spa" is replaced with -- spots --;
Line 30, "attach" is replaced with -- attached --; and
Line 43, "mated" is replaced -- material --.

Signed and Sealed this

Thirteenth Day of December, 2005

JON W. DUDAS
*Director of the United States Patent and Trademark Office*